US011860040B2

(12) United States Patent
Morris et al.

(10) Patent No.: US 11,860,040 B2
(45) Date of Patent: Jan. 2, 2024

(54) INFRARED TRANSPARENT CONSTRUCTS AND METHODS OF MAKING THEM

(71) Applicant: Science Applications International Corporation, Reston, VA (US)

(72) Inventors: David M. Morris, Bloomington, IN (US); John P. Timler, River Ridge, LA (US)

(73) Assignee: Science Applications International Corporation, Reston, VA (US)

( * ) Notice: Subject to any disclaimer, the term of this patent is extended or adjusted under 35 U.S.C. 154(b) by 519 days.

(21) Appl. No.: 17/150,015

(22) Filed: Jan. 15, 2021

(65) Prior Publication Data

US 2022/0228919 A1 Jul. 21, 2022

(51) Int. Cl.
*G01J 5/08* (2022.01)
*G01J 5/0875* (2022.01)

(52) U.S. Cl.
CPC .................................. *G01J 5/0875* (2013.01)

(58) Field of Classification Search
CPC ...................................................... G01J 5/0875
USPC .......................................... 250/493.1, 504 R
See application file for complete search history.

(56) References Cited

U.S. PATENT DOCUMENTS

| | | | | |
|---|---|---|---|---|
| 6,100,209 A | * | 8/2000 | Bentem | C03C 8/14 427/419.4 |
| 6,531,341 B1 | * | 3/2003 | Peterson | H01L 27/1469 257/E21.705 |
| 6,614,024 B1 | | 9/2003 | Oei et al. | |
| 7,161,552 B2 | | 1/2007 | Picard et al. | |
| 9,427,909 B2 | | 8/2016 | Casale et al. | |
| 9,622,338 B2 | | 4/2017 | Song et al. | |
| 10,355,349 B2 | | 7/2019 | Rojanski et al. | |
| 2003/0201164 A1 | | 10/2003 | Johnson et al. | |
| 2022/0134131 A1 | * | 5/2022 | Bourke, Jr. | A61N 5/067 607/88 |

OTHER PUBLICATIONS

C. Wang, et al., "A general method to synthesize and sinter bulk ceramics in seconds," Science vol. 368, Issue 6490, pp. 521-526 (May 1, 2020).

* cited by examiner

*Primary Examiner* — Nicole M Ippolito
(74) *Attorney, Agent, or Firm* — Banner & Witcoff, Ltd.

(57) ABSTRACT

Infrared transparent constructs (e.g., infrared transparent windows) may be shaped as a dome (e.g., for an infrared detector system) and/or other desired geometries, such as portions of IR seeker domes. Electrically conductive tracing(s) may be printed in desired shapes and forms, e.g., in the form of EMI shielding, an FSS grid, an anti-static component, electrical connectors, etc., and integrated into the interior of the construct structure. The electrically conductive tracing(s) may be printed between layers of independent infrared transparent window components that are then engaged together to form a window preform. Additionally or alternatively, the electrically conductive tracing(s) may be printed between printed layers of infrared transparent ceramic or plastic material built up to form the window preform. Once formed, the window preform may be sintered, e.g., in an ultrafast high temperature sintering process (and optionally further treated) to produce the final infrared transparent construct.

20 Claims, 9 Drawing Sheets

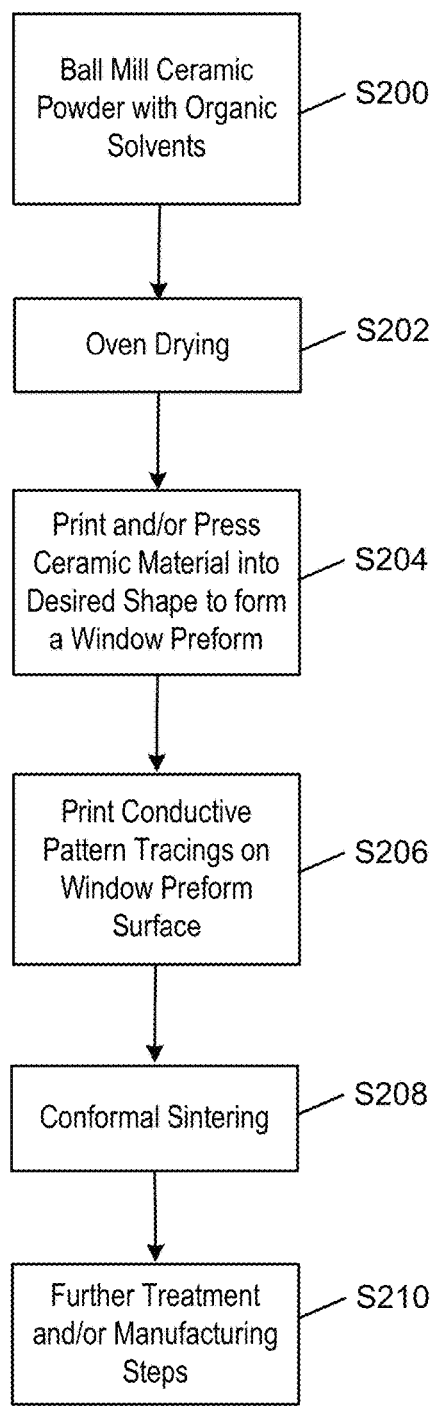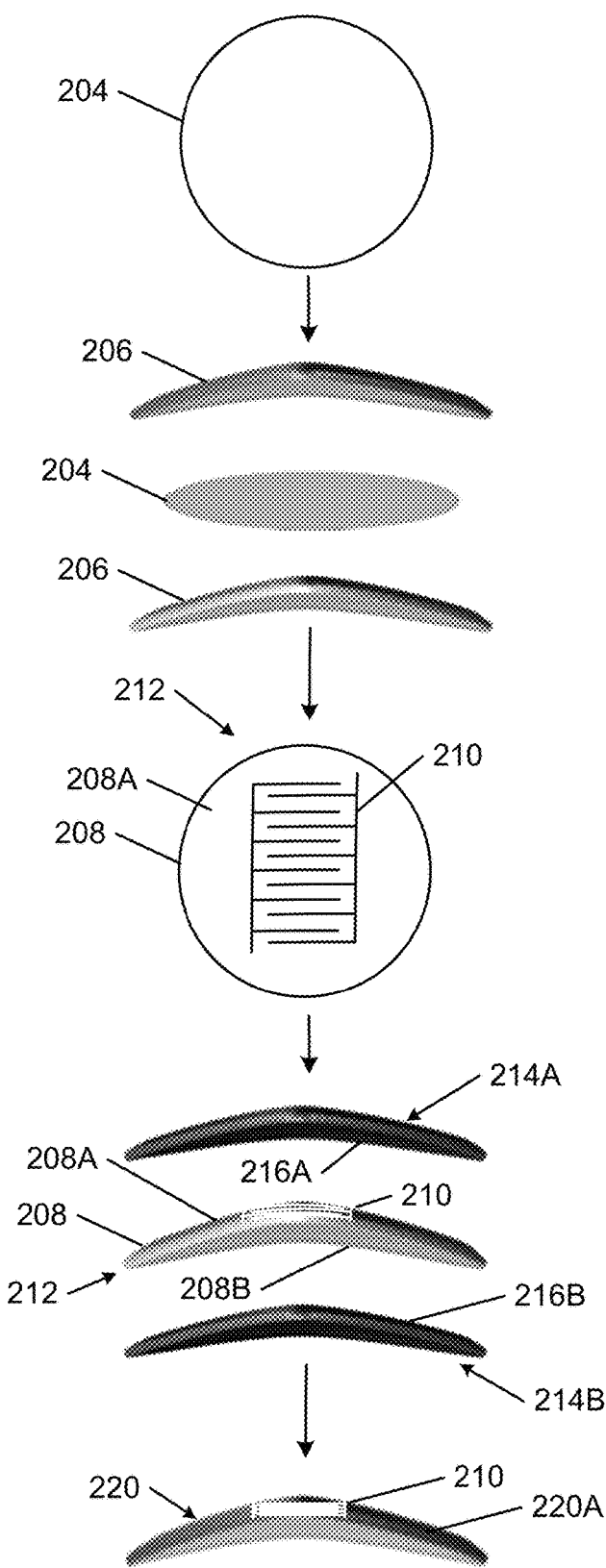
FIG. 2A
FIG. 2B

INFRARED TRANSPARENT CONSTRUCTS AND METHODS OF MAKING THEM

GOVERNMENT LICENSE RIGHTS

This invention was made with Government support under Contract No. N00178-04-D-4119-FC46 awarded by the United States Navy. The Government has certain rights in this invention.

BACKGROUND

Infrared radiation is electromagnetic energy within a portion of the electromagnetic spectrum that extends between the long wavelengths (red wavelengths) of the visible spectrum to the microwave wavelengths. Infrared radiation typically is considered to include radiation within the wavelength range of about 700 nanometers to about 1 millimeter. While generally not visible to the human eye, infrared radiation can be sensed by humans, e.g., as heat. Infrared radiation also can be detected electronically by infrared sensors or detection systems.

Infrared sensors and detection systems are used in a wide range of products and industries. Examples of such products include thermal imaging cameras, night vision goggles, remote controls, thermometers, guidance systems (e.g., for missiles), tracking systems, etc.

Products including infrared sensors and detection systems typically have their sensitive components protected within some type of housing or case. The infrared radiation, which typically originates from a source external to the product, must pass through the housing or case to reach the sensors and detection systems. In order to increase the intensity of infrared radiation incident on the sensors and detection systems, product housings or cases may include an infrared transparent construct (e.g., one or more structural elements, such as an infrared transparent window) through which the infrared radiation transmits prior to arriving at the sensors and detection systems.

SUMMARY

This Summary introduces a selection of concepts relating to this technology in a simplified form as a prelude to the Detailed Description that follows. This Summary is not intended to identify key or essential features.

Aspects of this disclosure relate to infrared transparent constructs, such as infrared transparent windows, methods of making them, and/or processes for making such constructs and/or products containing them. The infrared transparent constructs may be shaped as a dome (e.g., for an infrared detector system), window, and/or other desired geometries. In some more specific examples of this technology, the infrared transparent constructs may be formed as portions of IR seeker domes and/or windows for them.

Infrared transparent windows, e.g., for IR seeker domes or other products, may comprise: (a) a window base component including an interior surface and an exterior surface opposite the interior surface, wherein the window base component is comprised of an infrared transparent ceramic or plastic material; and (b) a first tracing at least partially located between the interior surface and the exterior surface. This first tracing may comprise an electrically conductive material, and at least 50% of a surface area or linear length of the first tracing may comprise an embedded tracing portion embedded in the window base component between the interior surface and the exterior surface. The first tracing in at least some examples of this technology may be formed as one of the following: electromagnetic interference shielding, a frequency selective surface grid, or an anti-static component. The infrared transparent windows may be made from "modular parts" (e.g., two independent window preform components) that are fixed together with the embedded tracing portion located between the preform components or as an "integral construction" (e.g., printed) with the embedded tracing portion included between printed layers.

These and other features of this technology are described in more detail below.

BRIEF DESCRIPTION OF THE DRAWINGS

Some features of this technology are shown by way of example, and not by way of limitation, in the figures of the accompanying drawings and in which like reference numerals refer to similar elements.

FIGS. 2A and 2B provide a flow chart and illustrate various features of a method for producing infrared transparent constructs in accordance with some examples of this technology.

DETAILED DESCRIPTION

Figure 1A:
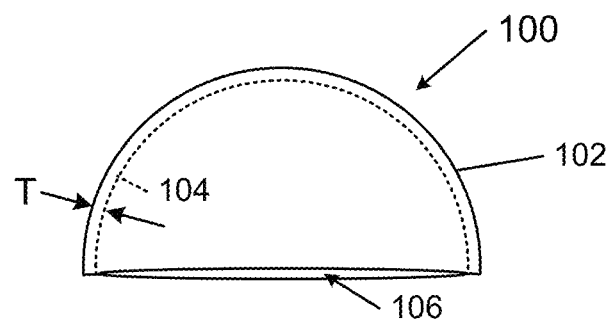
FIGS. 1A, 1B, and 1C provide examples of various shapes of infrared transparent constructs in accordance with aspects of this technology.

As described above, aspects of this technology relate to the structure of infrared transparent constructs (e.g., infrared transparent windows), e.g., of the types described above (and described in more detail), products containing such constructs, and methods of making constructs and products of the types described above (and described in more detail below).

The following specification uses various terms that are intended to have the meanings provided below unless otherwise specified or clear from the context.

"Infrared radiation," as that term is used herein, means electromagnetic energy within the wavelength range of 700 nanometers ("nm") to 1 millimeter ("mm") of the electromagnetic spectrum.

An "infrared transparent" material, as that term is used herein, is a material that allows infrared radiation within at least a portion of the infrared spectrum incident on one surface of the material to pass through to the opposite surface of the material without substantial scattering and/or attenuation. In at least some examples of this technology, an "infrared transparent" material will allow at least 60% of incident infrared radiation within an infrared wavelength or wavelength range of interest to pass through it (and in some examples, at least 70%, at least 80%, at least 90%, at least 95%, or even at least 98% of incident infrared radiation within an infrared wavelength or wavelength range of interest will pass through it). The infrared transparency of a material may be affected by various physical properties, such as presence of doping materials and/or impurities, thickness, etc. Infrared transparent materials include, but are not necessarily limited to: zinc sulfide (ZnS, e.g., having a transmission range of about 0.37 to 14 microns); aluminum oxynitride (AlON, e.g., having a transmission range of about 0.25 to 6 microns); magnesium fluoride ($MgF_2$, e.g., having a transmission range of about 0.13 to 7 microns); magnesium aluminate spinel (also called "spinel" herein, having a transmission range of about 0.25 to 6.5 microns); calcium fluoride ($CaF_2$, e.g., having a transmission range of about 0.15 to 9.0 microns); gallium arsenide (GaAs, e.g., having a transmission range of about 1-15 microns); sodium chloride (NaCl, e.g., having a transmission range of about 0.2 to 20 microns); germanium (Ge, e.g., having a transmission range of about 2 to 17 microns); Schott BK7 glass (a borosilicate glass e.g., having a transmission range of 0.35 to 2.0 microns); fused silica UV grade or IR grade ($SiO_2$, e.g., having a transmission range of 0.18 to 3.5 microns); lithium fluoride (LiF, e.g., having a transmission range of about 0.12 to 6.5 microns); quartz ($SiO_2$, e.g., having a transmission range of about 0.15 to 3.3 microns); thallium bromoiodide (TlBr-TlI, e.g., having a transmission range of about 0.6 to 40 microns); zinc selenide (ZnSe, e.g., having a transmission range of about 0.55 to 20 microns); and infrared transparent plastics (e.g., having a transmission range of about 8-12 microns and/or about 15-40 microns). Such infrared transparent materials are known and commercially available from various sources.

"Construct," as that term is used herein, means any type of structural element of a product. In some examples, a "construct" will constitute an element of a housing or casing for a product (e.g., an exterior component of such housing or casing), such as a product that contains one or more infrared sensors or one or more infrared detection systems.

An "infrared transparent window," as that term is used herein, is a "construct" or a portion thereof formed from an infrared transparent material. In some examples, "infrared transparent windows" may be provided in a product (e.g., in an overall construct of a product) for the purpose of transmitting infrared radiation to an infrared sensor or detection system provided as part of the product. Infrared transparent windows according to at least some aspects of this technology may have any desired shapes including flat, domed, hemispherical, curved, etc. Some aspects of this technology include infrared transparent windows and methods of making them in specific shapes, such as domed, hemispherical, curved, etc. Infrared transparent windows may have suitable structures and/or properties and/or may be suitably positioned with respect to one or more infrared sensors to "bend" the transmitted radiation to or toward a sensor or detection system (e.g., function as a lens or focusing component).

"Ultrafast high-temperature sintering," as that term is used herein, means a sintering process that uses high heating rates (e.g., between 800° C./minute to 12000° C./minute), high cooling rates (e.g., between 800° C./minute to 12000° C./minute), and high sintering temperatures (e.g., between 1000° C. to 3000 C°). Examples of ultrafast high-temperature sintering processes that may be used in accordance with aspects of this technology are described in Wang, et al., "A General Method to Synthesize and Sinter Bulk Ceramics in Seconds," *Science*, 368, pp. 521-526 (2020), which article is entirely incorporated herein by reference.

At least some example sintering techniques used in methods according to aspects of this technology, including at least some examples of ultrafast high-temperature sintering techniques used according to aspects of this technology, may include one or more of the following: (a) increasing temperature of one or more heating elements forming a first heating surface and a second heating surface from a start temperature to a sintering temperature in 1 minute or less (and in some examples, in 45 seconds or less, or even 30 seconds or less); (b) isothermal sintering for a time period of less than 45 seconds (and in some examples, less than 40 seconds, less than 30 seconds, or even less than 25 seconds); and/or (c) after the sintering time period is complete, cooling the one or more heating elements forming the first heating surface and the second heating surface within a time period of less than 40 seconds (and in some examples, less than 30 seconds, less than 25 seconds, or even less than 20 seconds). The heating elements may comprise Joule-heating carbon strips, which are capable of producing temperatures of up to about 3000° C. The heating surfaces of the heating elements may be configured to or configurable to conform to the shape of the surface of the component being sintered. The heating rates, cooling rates, and/or sintering temperatures described in this specification correspond to the heating rates, cooling rates, and/or sintering temperatures of the heating elements used for the sintering process (e.g., the heating rates, cooling rates, and/or sintering temperatures of the heating element surfaces in contact with the part to be sintered).

The sintering processes used in any of the examples described herein may include laser assisted heating, e.g., using a laser to target areas for high heating and/or generally to increase heat applied for sintering. The sintering processes used in this technology may improve the mechanical properties of the sintered product, such as increasing its hardness, improving resistance to thermal and/or heat shock, etc. In some examples of this technology, initial heating can be performed using a laser and then an ultrafast high-temperature sintering process or other sintering process can be used on the preheated material to complete the sintering step (e.g., to form a more homogenous final product).

Figure 1B:
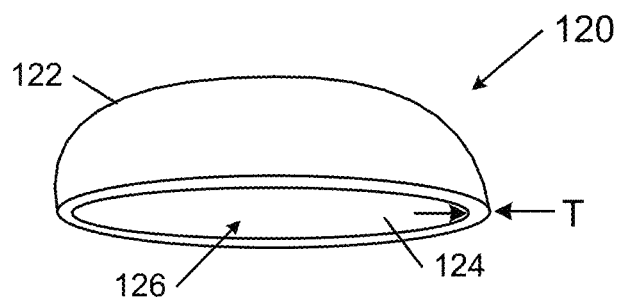
Figure 1C:
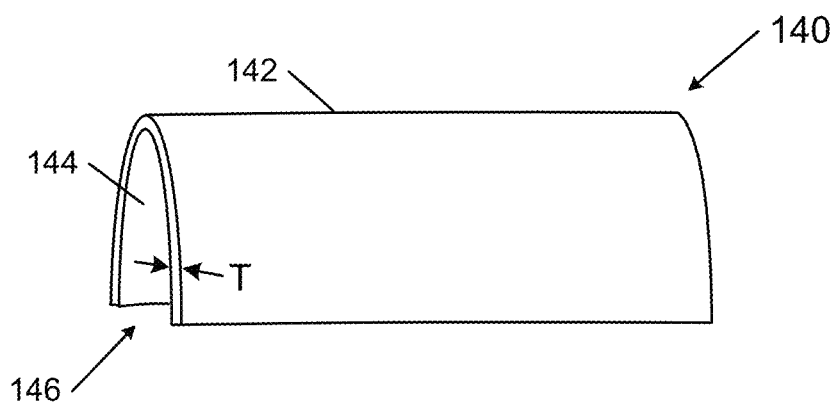

FIGS. 1A-1C illustrate various example shapes of infrared transparent constructs (e.g., infrared transparent windows) in accordance with aspects of this technology. FIG. 1A shows a dome structure 100. While not required, such dome structures 100 may be in the form of a hemisphere or other sectional portion of a sphere (also called a "spherical cap" or "spherical dome"). The dome structure 100 of this illustrated example includes an exterior surface 102 and an opposite interior surface 104 (the interior surface is shown by a broken line). An interior space within the dome structure 100 is exposed and accessible via opening 106. If desired, the interior surface 104 may centered with and/or follow the same contour as the exterior surface 102, e.g., thereby creating a constant wall thickness T (the thickness T is the shortest, most direct distance between the exterior surface 102 and the interior surface 104 at a given point). As a more specific example, each of the exterior surface 102 and interior surface 104 may be shaped as a spherical cap, and the surfaces 102, 104 may be oriented concentrically. Alternatively, if desired, the interior surface 104 and exterior surface 102 may have different shapes over at least some portion of their respective surface areas (e.g., thereby varying the wall thickness T). Dome structures 100 of this type may be well suited for various uses, such as infrared transparent windows for IR seekers on missiles or other projectiles.

FIG. 1B shows another type of dome structure 120 for an infrared transparent construct (e.g., infrared transparent window). This illustrated example dome structure 120 has an exterior surface 122 that is curved over at least some portion of its surface area but not shaped as a section of a hemisphere. Exterior surfaces 122 of this type may be continuously curved, curved as a section of an ellipsoid or ovoid, curved in an arbitrary shape, curved in some portions and flat in others (e.g., curved around its side edge and flat, flattened, or less curved at its closed end and/or exposed face), etc. An interior surface 124 lies opposite the exterior surface 122, and it may follow the same general contour as the exterior surface 122 (although this is not a requirement in all examples of this technology). The interior space within the dome structure 120 may be exposed and accessible via opening 126. The wall thickness T (as defined above) may be constant or varied over at least some portion of the surface area of the dome structure 120 (e.g., depending on whether the interior surface 124 and exterior surface 122 follow the same general contour).

Another type of dome structure 140 for an infrared transparent construct (e.g., infrared transparent window) is shown in FIG. 1C. The dome structure 140 of this illustrated example includes an exterior surface 142 and an opposite interior surface 144 that are hemi-cylindrically shaped and axially aligned. Alternatively, surfaces 142, 144 may be shaped to be a different sectional portion of cylinder. An interior space within the dome structure 140 is exposed and accessible via opening 146 (e.g., through the bottom and/or one or both sides). If desired, the interior surface 144 may be axially centered with and/or follow the same contour as the exterior surface 142, e.g., thereby creating a constant wall thickness T (as defined above). Alternatively, if desired, the interior surface 144 and exterior surface 142 may have different shapes over at least some portion of their surface areas (e.g., thereby varying the wall thickness T). Shapes other than cylinder sections may be provided, such as sections of a conical shape, other axial elongated shapes, sections of an ellipsoid, sections of an ovoid, etc.

Building on the general structural information of infrared transparent windows in accordance with examples of this technology shown in FIGS. 1A-1C, additional features of structures and methods in accordance with aspects of this technology now will be described in conjunction with FIGS. 2A and 2B. FIG. 2A provides a general outline of steps in an infrared transparent construct production method in accordance with aspects of this technology and FIG. 2B illustrates some features of this method. As a first Step S200 in this example process, a ceramic material powder, such as zinc sulfide, aluminum oxynitride, magnesium fluoride, and/or spinel, may be mixed in a ball mill with one or more organic solvents, such as isopropyl alcohol, ethanol, etc., for several hours, e.g., from 4 to 12 hours. This mixed material may then be dried at Step S202, e.g., in a conventional manner, such as in an oven at 200° C. for a sufficient time to reach a desired level of dryness (e.g., 1 hour to 12 hours).

Once dried, the ceramic material may be pressed and/or 3D printed into a desired shape for a window preform (Step S204). When printed, any desired 3D printing process may be used, such as an aerosol jet method, an ink jet method, an extrusion method (e.g., paste extrusion), a fused deposition modeling method, a laser sintering method, etc. The ceramic material may be further processed in any appropriate manner to place it in a form suitable for use in the 3D printing process selected.

As a more specific example, FIG. 2B shows a two step process. First, an initial window preform 204 may be produced by a 3D printing process. While this initial window preform 204 may be printed directly into the final desired shape for the infrared transparent window product to be prepared, in this illustrated example it has a different, intermediate shape. This initial window preform 204 may then be further shaped in a pressing process between two pressing plates 206. This step, when conducted, may further compress the powder and may further shape the initial window preform 204 into the final desired shape for the infrared transparent window product to be prepared or it may be formed into another intermediate shape. For example, at this Step S204, the initial window preform 204 may be pressed into a spherical cap shape, a cylindrical section shape, or other desired shape (e.g., as shown in FIGS. 1A-1C). FIG. 2B shows this example pressed window preform 208 from a top view, e.g., looking downward at a dome shape, such as a spherical cap (although any other shape may be provided for the pressed window preform 208).

Alternatively, if desired, the window preform 204 can be formed directly by printing the ceramic material into the desired shape and the pressing step can be omitted. As another alternative, if desired, the ceramic material can be pressed directly into the desired shape and the 3D printing step can be omitted.

Once the window preform 208 is prepared, at Step S206, one or more conductive tracings 210 may be printed on one or more of its surfaces 208A (e.g., the interior surface 104, 124, 144 or exterior surface 102, 122, 142). This printing Step S206 may be performed using any desired type of 3D printing process, such as an aerosol jet method, an ink jet method, an extrusion method (e.g., paste extrusion), etc. The conductive tracing(s) 210 may be printed in any desired shape(s) for performing any desired function(s). In some examples of this technology, the tracing(s) 210 (which may be continuous or discontinuous on the surface 208A) may form at least a portion of: electromagnetic interference ("EMI") shielding, a frequency selective surface ("FSS") grid, an anti-static component, wiring to and/or from one or more electronic components and/or an electrical ground, etc. After any desired tracings 210 have been provided, the resulting combination of window preform 208 and tracings 210 may form window preform 212.

In some examples of this technology, the "tracing(s)" 210 (and 310 and 410 described below) may include one or more segments or lines, e.g., akin to "wires," having a longer length (dimension "L") than their width dimension (dimension "W") and/or thickness dimension (dimension "T"). A continuous tracing may comprise one or more segments that define a single path extending between a beginning and end of the tracing (e.g., a straight line path, a path with one or more curves, angles, and/or switchbacks, etc.) or may comprise one or more segments that define multiple paths (e.g., one or more branches, forks, etc.). A length (e.g., a linear length) of a tracing may comprise a sum of lengths of segments of that tracing. As some more specific examples, a tracing 210/310/410 may have a continuous length L at least 5 times greater than its width W and/or thickness T over at least 50% of the continuous length dimension. As still additional more specific examples, a tracing 210/310/410 may have a continuous length L at least 10 times greater, at least 15 times greater, at least 20 times greater, at least 25 times greater, at least 40 times greater, at least 50 times greater, at least 75 times greater, or even at least 100 times greater than its width dimension W and/or thickness dimension T over at least 50% of the continuous length dimension (and even over at least 75%, at least 80%, at least 90%, or even at least 95% of the continuous length dimension L). As some more absolute potential dimensions, one or more segments or lines of a tracing 210/310/410 may have width dimensions W of less than 2 inches (5.1 cm), and in some examples, less than 1.5 inches (3.8 cm), less than 1 inch (2.5 cm), less than 0.75 inch (1.9 cm), less than 0.5 inch (1.3 cm), or even less than 0.25 inch (0.6 cm) wide. Additionally or alternatively, as some further absolute potential dimensions, one or more segments or lines of a tracing 210/310/410 may have thickness dimensions T of less than 0.5 inch (1.3 cm), less than 0.25 inch (0.6 cm), or even less than 0.125 inch (0.3 cm) thick. All dimensions and/or dimension ratios described herein are merely examples, and dimensions and/or dimension ratios may be outside of any ranges associated with any such examples. For example, one or more segments or lines of a tracing 210/310/410 may have W dimensions outside of any ranges associated with the aforementioned examples and/or may have T dimensions outside of any ranges associated with the aforementioned examples.

In some examples, at least some (or some portion) of the tracing(s) 210/310/410 may be structured and sized with dimensions akin to conventional wiring on printed circuit board. The tracing 210/310/410 patterns may include two dimensional grids, hexagonal grids, circuit wiring, electronic component conductors etc. Commercially available conductive precursors are known in the art suitable for printing such conductive tracing(s) 210/310/410 (e.g., copper pastes, inks, and/or dyes available from Kuprion Inc.).

Window preform 212 may then be sintered in Step S208, e.g., using an ultrafast high-temperature sintering technique. In the sintering Step S208, window preform 212 may be placed between heating elements 214A, 214B within an inert atmosphere (e.g., a container filled with inert gas, such as argon), and the heating elements 214A, 214B may be heated and cooled (and the sintering otherwise also takes place) based on an ultrafast high-temperature sintering technique, as described above. The heating elements 214A, 214B may be made from carbon cloth or carbon paper (e.g., a Joule-heating carbon strip) attached to a glass slide or other silica based support material (e.g., a base support material that can remain stable and structurally sound under the sintering conditions). Heating element materials of this type (e.g., carbon cloth or carbon strips) are commercially available (e.g., from Fuel Cell Earth of Woburn, MA). A power supply may heat the heating elements 214A, 214B and may be controllable to control the temperature of the heating elements 214A, 214B, e.g., in conventional manners.

FIG. 2A identifies Step S208 as "conformal sintering." "Conformal sintering," as the term is used herein in this context, means that the sintering takes place using heating elements 214A, 214B that have surface shapes configured to or configurable to correspond to the surface of the shape being sintered. More specifically, in FIG. 2B, heating element 214A surface 216A may be shaped the same shape as the shape of surface 208A (which may correspond to one of the shapes of surface 102, 122, 142 for the window shapes shown in FIGS. 1A-1C, respectively). Similarly, heating element 214B surface 216B may be shaped the same shape as the shape of surface 208B (which may correspond to one of the shapes of surfaces 104, 124, 144 for the window shapes shown in FIGS. 1A-1C, respectively).

In some examples of this technology, the part being sintered (as well as the final sintered part) may have an overall thickness of less than 4 inches (10.2 cm) thick (e.g., the dimension between the surfaces that the heating elements 214A, 214B contact) over at least 50% of the area located between the heating elements 214A, 214B. In further examples, the part being sintered will be less than 3.5 inches (8.9 cm), less than 3 inches (7.6 cm), less than 2.5 inches (6.4 cm), less than 2 inches (5.1 cm), less than 1.5 inches (3.8 cm), or even less than 1 inch (2.5 cm) thick (e.g., the dimension between the surfaces that the heating elements 214A, 214B contact) over at least 50% of the area located between the heating elements 214A, 214B. Any of these thickness ranges also may be present over at least 60%, at least 75%, at least 80%, at least 90%, or even at least 95% of the area located between the heating elements 214A, 214B.

If, when ready to start sintering Step S208, surface pair 208A and 216A and/or surface pair 208B and 216B is/are not the same shape, one or more actions can be taken to assure shape matching for the conformal sintering process. For example, before Step S208, an additional pressing and/or other shaping step can be performed on window preform 212 to change one or more of surface 208A and/or 208B shapes to correspond to the shapes of surface 216A and/or 216B. Additionally or alternatively, pressing force applied to window preform 212 by heating elements 214A, 214B may be sufficient to change the shape of surfaces 208A and/or 208B to correspond to the shapes of surfaces 216A and/or 216B, respectively. Additionally or alternatively, the surface(s) 216A and/or 216B of heating elements 214A and 214B, respectively, may be sufficiently deformable under conditions of use so that pressing force applied to window preform 212 by heating elements 214A, 214B may be sufficient to make the shape(s) of surfaces 216A and/or 216B conformable to the shapes of surfaces 208A and/or 208B, respectively. Preferably, during sintering Step S208, heating element 214A surface 216A will lie adjacent and in contact with surface 208A and heating element 214B surface 216B will lie adjacent and in contact with surface 208B. After sintering (and cooling), a final infrared transparent construct (e.g., window) 220 is formed.

If desired (e.g., depending on the ultimate target end use), e.g., after the sintering Step S208 (and/or any other suitable time in the process), any further desired treatments and/or manufacturing steps (e.g., to incorporate the window 220 into a final product) may be completed (Step S210). Such additional treatments may comprise one or more of: chemical vapor deposition treatment of one or more surfaces; sputtering processes; atomic layer deposition; transparency-enhancing or modifying treatments; hardness-enhancing or modifying treatments; etc. Such additional manufacturing steps may comprise: attachment of hardware components; electrically connecting to other components; further shaping; engagement in a detector system or other product; etc.

In the infrared transparent construct 220 structure and process described above, the electrically conductive tracing(s) 210 may be exposed on a surface 220A of the construct 220. While this can be acceptable for some applications and uses, it may have disadvantages in others. For example, infrared domes used in conventional seeker heads are constructed with conductive materials on the outside of the final product. These conductive materials can be quickly damaged and/or corroded, e.g., either in the typical environment of use and/or from use at high speeds at which missiles including seeker heads operate. Other conventional systems and methods involve use of a larger wire mesh on the inside of a dome head, but this arrangement tends to cause interference with infrared transparency. Some aspects of this technology seek to alleviate some of the issues with conventional seeker heads of these types.

Figure 3A:
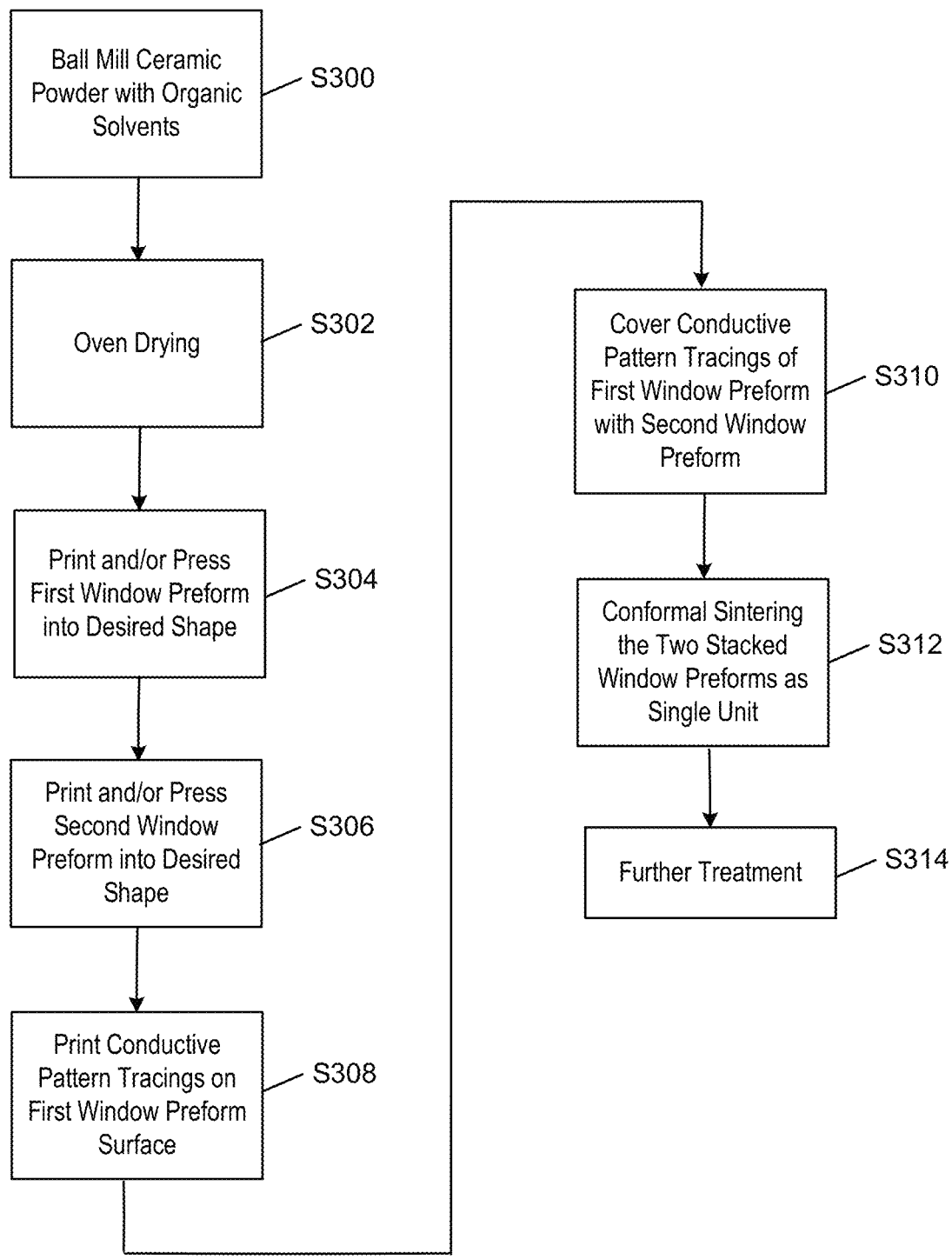
FIGS. 3A and 3B provide a flow chart and illustrate various features of a modular method for producing infrared transparent constructs in accordance with some examples of this technology.
Figure 3B:
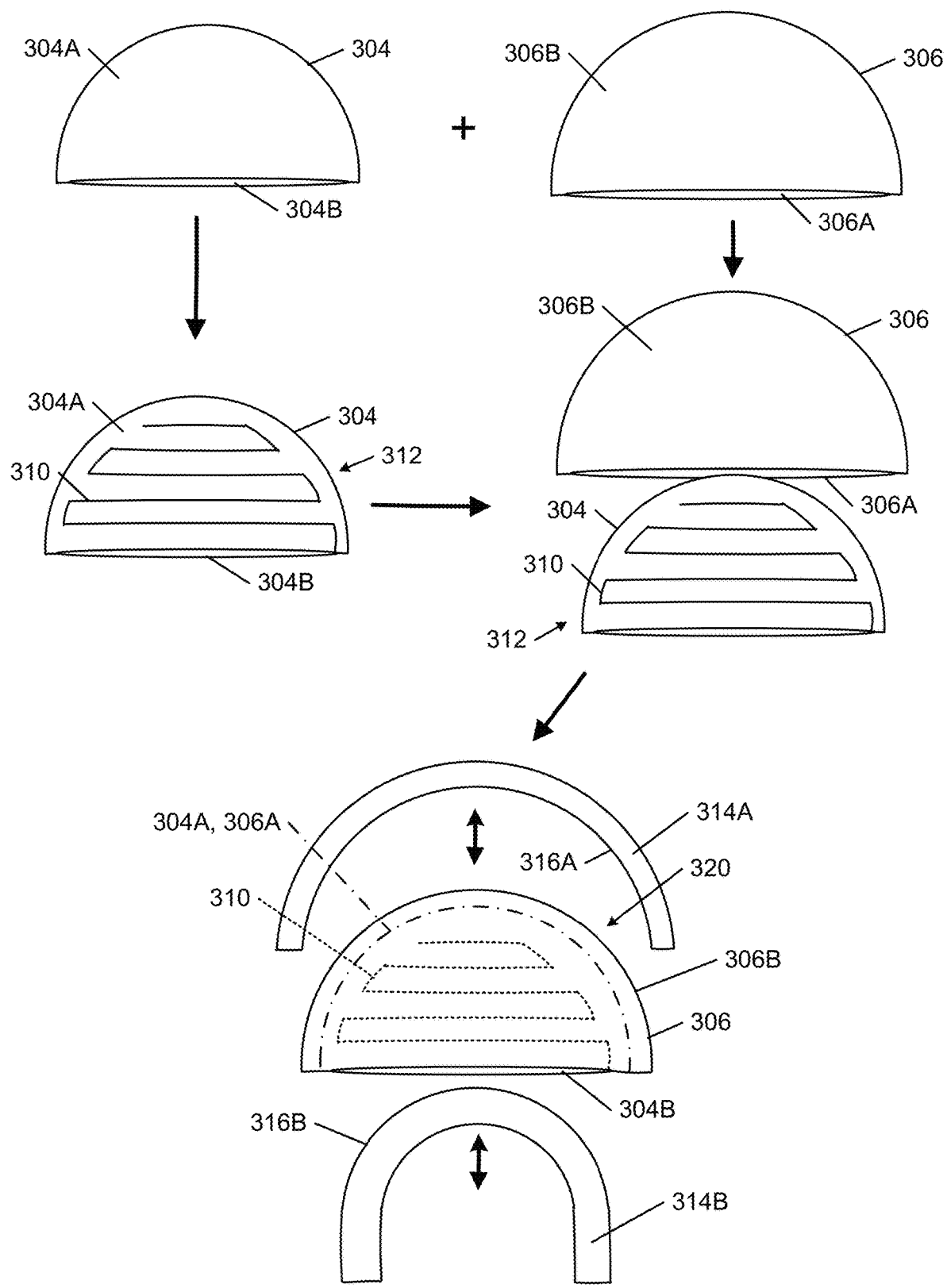

FIGS. 3A and 3B illustrate additional methods and structures in accordance with some aspects of this technology. FIG. 3A provides a flow chart of an example manufacturing method and FIG. 3B illustrates the structures of infrared transparent window preforms formed at various steps of this example method. As a first Step S300 in this example process, a ceramic material powder, such as zinc sulfide, aluminum oxynitride, magnesium fluoride, and/or spinel, may be mixed in a ball mill with one or more organic solvents, such as isopropyl alcohol, ethanol, etc., for several hours, e.g., from 4 to 12 hours. This mixed ceramic material may be dried at Step S302, e.g., in a conventional manner, such as in an oven at 200° C. for a sufficient time to reach a desired level of dryness (e.g., 1 hour to 12 hours).

Once dried, the ceramic material may be pressed and/or 3D printed into a desired shape for a first window preform 304 (Step S304). First window preform 304 also is referred to as an "interior window component" herein. To this point, the process may correspond to the processes described above with respect to Steps S200 to S204 and the production of window preforms 204 and/or 208 in conjunction with FIGS. 2A and 2B. Further, any of the various features, options, and/or alternatives described above with respect to Steps S200 to S204 and the production of window preforms 204 and/or 208 may be used in the process of FIGS. 3A and 3B to produce first window preform 304. Thus, much of the description of these similar process steps is omitted from this description of FIGS. 3A and 3B. Alternatively, in some examples of this technology, rather than making window preform 304, window preform 304 may be obtained as an existing product (e.g., an infrared transparent construct from a commercial source).

In addition to producing the first window preform 304, the method of FIGS. 3A and 3B includes a Step S306 of producing (e.g., printing and/or pressing) a second window preform 306 (second window preform 306 also is referred to as an "exterior window component" herein). The Step S306 of producing the second window preform 306 may follow the same process(es) as those used to produce the first window preform 304 (and/or any of the steps, features, options, and/or alternatives described above with respect to Steps S200 to S204 and the production of window preforms 204 and/or 208). Alternatively, in some examples of this technology, rather than making window preform 306, window preform 306 may be obtained as an existing product (e.g., an infrared transparent construct from a commercial source). Window preforms 304 and 306 may be produced such that the exterior surface 304A of the first window preform 304 at least in part corresponds in shape with the interior surface 306A of second window preform 306. In some examples of this technology, at least 50% of the exterior surface 304A area of first window preform 304 will correspond in shape to at least a portion of the interior surface 306A of second window preform 306 (and in some examples, at least 60%, at least 75%, at least 80%, at least 90%, or even at least 95% of the exterior surface 304A area of first window preform 304 will correspond in shape to at least a portion of the interior surface 306A of second window preform 306). Additionally or alternatively, in at least some examples of this technology, at least 50% of the interior surface 306A area of second window preform 306 will correspond in shape to at least a portion of the exterior surface 304A of first window preform 304 (and in some examples, at least 60%, at least 75%, at least 80%, at least 90%, or even at least 95% of the interior surface 306A of second window preform 306 will correspond in shape to at least a portion of the exterior surface 304A of first window preform 304). The term "correspond in shape" as used herein in this context means that the two surface shapes will lie immediately adjacent and/or contact one another, e.g., when the window preforms 304 and 306 are oriented with surfaces 304A and 306A facing one another (e.g., stacked together), as will be described in more detail below. In some examples, surfaces 304A and 306A will "correspond in shape" by being spherically cap shaped of substantially the same diameter and arranged concentrically.

Once the first window preform 304 is prepared, at Step S308, one or more conductive tracings 310 may be printed on one or more of its surfaces, e.g., exterior surface 304A in this illustrated example. This printing Step S308 may be conducted using any desired type of 3D printing process, such as an aerosol jet method, an inkjet method, an extrusion method (e.g., paste extrusion), etc. Commercially available conductive precursors are known in the art suitable for printing such conductive tracing(s) 310, as noted above. The conductive tracing(s) 310 may be printed in any desired shape(s) for performing any desired function(s). In some examples of this technology, the tracing(s) 310 (which may be continuous or discontinuous on the surface 304A) may form at least a portion of: EMI shielding, an FSS grid, an anti-static component, wiring to and/or from one or more electronic components, wiring to an electrical ground, etc. After any desired tracings 310 have been provided, the resulting combination of window preform 304 and tracings 310 may form composite structure 312 (which also may be considered a window preform).

Additionally or alternatively, if desired, one or more conductive tracings 310 may be printed onto the interior surface 306A of the exterior window preform 306. Thickness dimension(s) T for one or more segments or lines of the tracing(s) 310 printed onto the first window preform 304 may be selected to facilitate arrangement of the composite structure 312 and the second window preform 306, as described below. Also or alternatively, thickness dimension(s) T for one or more segments or lines of tracing(s) 310 printed onto the interior surface 306A may be selected to facilitate similar arrangement of the composite structure 312 (or of the first window preform 304) and the second window preform 306.

Composite structure 312 and second window preform 306 may then be arranged (e.g., stacked) so that the conductive tracing(s) 310 on the exterior surface 304A of the first window preform 304 is/are covered by (and may be in contact with) the interior surface 306A of second window preform 306. This composite structure 320 (which also constitutes a window "preform") is shown in FIG. 3B with the exterior surface 304A of first window preform 304, the interior surface 306A of the second window preform, and the tracing(s) 310 shown as broken lines. First window preform 304 may be considered an "interior window component" and second window preform 306 may be considered an "exterior window component" as those terms are used herein.

In at least some examples of composite structure 320, at least 50% of the exterior surface 304A area of first window preform 304 will lie immediately adjacent and/or contact at least a portion of the interior surface 306A of second window preform 306 (and in some examples, at least 60%, at least 75%, at least 80%, at least 90%, or even at least 95% of the exterior surface 304A area of first window preform 304 will lie immediately adjacent and/or contact at least a portion of the interior surface 306A of second window preform 306). Additionally or alternatively, in at least some examples of composite structure 320, at least 50% of the interior surface 306A area of second window preform 306 will lie immediately adjacent and/or contact at least a portion of the exterior surface 304A of first window preform 304 (and in some examples, at least 60%, at least 75%, at least 80%, at least 90%, or even at least 95% of the interior surface 306A of second window preform 306 will lie immediately adjacent and/or contact at least a portion of the exterior surface 304A of first window preform 304). The conductive tracing(s) 310 may lie immediately adjacent and/or contact both exterior surface 304A and interior surface 306A over some of the conductive tracing surface area and/or linear length (and in at least some examples of composite structure 320, at least 50% of the tracing(s) 310 surface area and/or linear length will lie immediately adjacent and/or contact one or both of the exterior surface 304A of first window preform 304 and/or the interior surface 306A of the second window preform 306 (and in some examples, at least 60%, at least 75%, at least 80%, at least 90%, or even at least 95% of the tracing(s) 310 surface area and/or linear length in the composite structure 320 will lie immediately adjacent and/or contact one or both of the exterior surface 304A and/or the interior surface 306A). In this manner, the conductive tracing(s) 310 (or at least any desired portion(s) thereof) is/are not externally exposed in the composite structure 320 and/or in the final window product (i.e., at least a portion of the tracing(s) 310 as described above are covered by second window preform 306 and/or sandwiched between the first window preform 304 and the second window preform 306). This layered or stacked construction helps protect the tracing(s) 310 in the remaining processing steps and in use.

The window preform comprising composite structure 320 may then be sintered as a single unit is Step S312, e.g., using an ultrafast high-temperature sintering technique in a conformal sintering process. In the sintering Step S312, composite structure 320 may be placed between heating elements 314A, 314B, and the heating elements 314A, 314B may be heated and cooled (and the sintering otherwise also takes place) based on an ultrafast high-temperature sintering technique, as described above. This conformal sintering Step S312 may take place using: (a) one heating element 314B having a surface 316B configured to or configurable to correspond to the shape of at least a portion of the interior surface 304B of the first window preform 304 (e.g., at least 50% of the area of interior surface 304B) and (b) one heating element 314A having a surface 316A configured to or configurable to correspond to the shape of at least a portion of the exterior surface 306B of the second window preform 306 (e.g., at least 50% of the area of exterior surface 306B). Additionally or alternatively, in some examples of this technology, one of the heating elements 314B may have a surface area that is configured to or configurable to contact a portion of the interior surface 304B corresponding with the location(s) of the tracing(s) 310 and one of the heating elements 314A may have a surface area that is configured to or configurable to contact a portion of the exterior surface 306B corresponding with the location(s) of the tracing(s) 310. Additionally or alternatively, in some examples of this technology, the heating elements 314A and/or 314B may have sufficient surface area at least to correspond to and sinter an area of the infrared transparent window that will be exposed to the external environment in the final product in which the infrared transparent window is placed.

If desired (e.g., depending on the ultimate target end use), e.g., after the sintering Step S312 (and/or any other suitable time in the process), any further desired treatments and/or manufacturing steps (e.g., to incorporate the window 330 into a final product) may be completed (Step S314). Such additional treatments may comprise one or more of: chemical vapor deposition treatment of one or more surfaces; sputtering processes; atomic layer deposition; transparency-enhancing or modifying treatments; hardness-enhancing or modifying treatments; etc. Such additional manufacturing steps may comprise: attachment of hardware components; electrically connecting to other components; further shaping; engagement in a detector system or other product; etc.

Figure 4A:
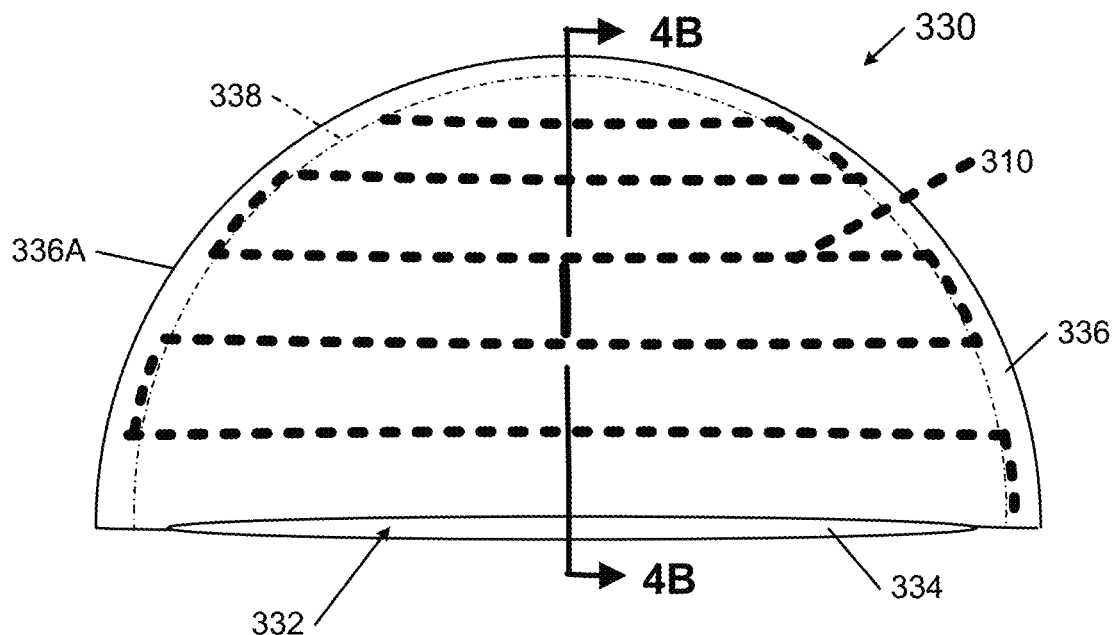
FIGS. 4A and 4B provide side and cross sectional views, respectively, of an example infrared transparent construct produced by the method described in conjunction with FIGS. 3A and 3B.
Figure 4B:
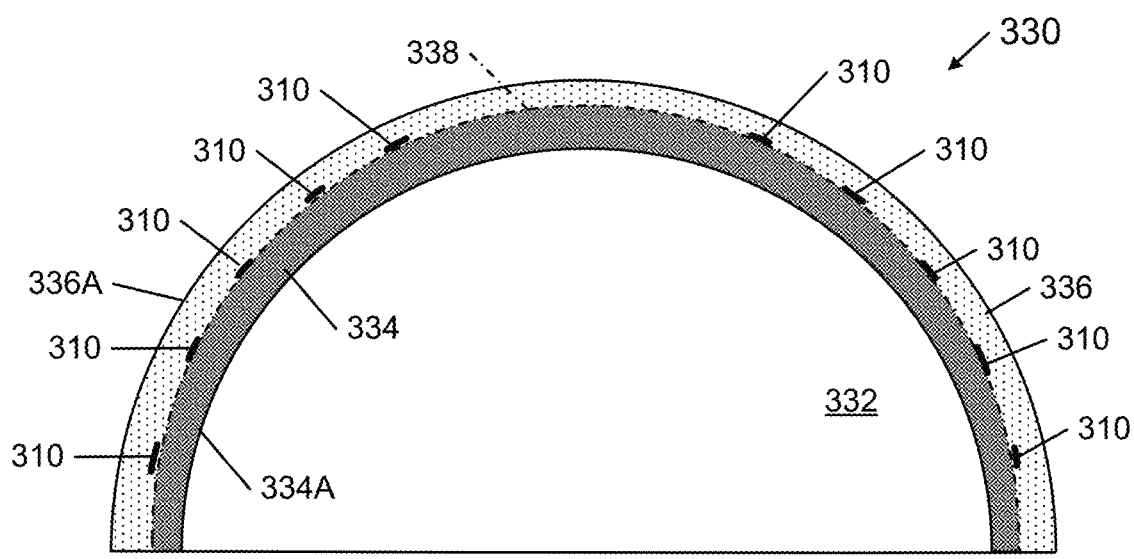

FIGS. 4A and 4B provide side and sectional views, respectively, of an infrared transparent window 330 (or other construct) formed by the process described above in conjunction with FIGS. 3A and 3B. As shown, the infrared transparent window 330 includes the two stacked components-reference number 334 identifies an interior window component that corresponds to the sintered version of first window preform 304 and reference number 336 identifies an exterior window component that corresponds to the sintered version of second window preform 306. In the sintered infrared transparent window 330 product, however, components 334 and 336 are fixed together (e.g., as a result of the sintering process). The electrically conductive tracing(s) 310 is/are shown at an intermediate location between the outermost surface 336A of the infrared transparent window 330 and the innermost surface 334A of the infrared transparent window 330. An open interior space 332 may be defined within the infrared transparent window 330 (and hardware components or other parts of a final product may be located at least partially within this open interior space 332).

FIGS. 4A and 4B illustrate a boundary 338 at the interface of components 334 and 336 (in dot-dash lines). While such a distinct interface boundary may be present in the final infrared transparent window 330 product, this is not a requirement in all examples of this technology. In some examples of this technology, there may be no distinct boundary present at the interface of components 334 and 336 (i.e., there may be no discernible boundary interface corresponding to prior preform surfaces 304A, 306B present in the sintered infrared transparent window 330 product). In other words, the cross sectional structure may appear continuous through the thickness of the cross section (other than at the locations of the tracing(s) 310). The presence or absence of a discrete boundary 338 may depend, for example, on sintering conditions and/or other production processes. In at least some examples of this technology, the prior boundary interface corresponding to preform surfaces 304A, 306B will change to a substantially continuous crystalline structure as a result of the sintering process.

Figure 5A:
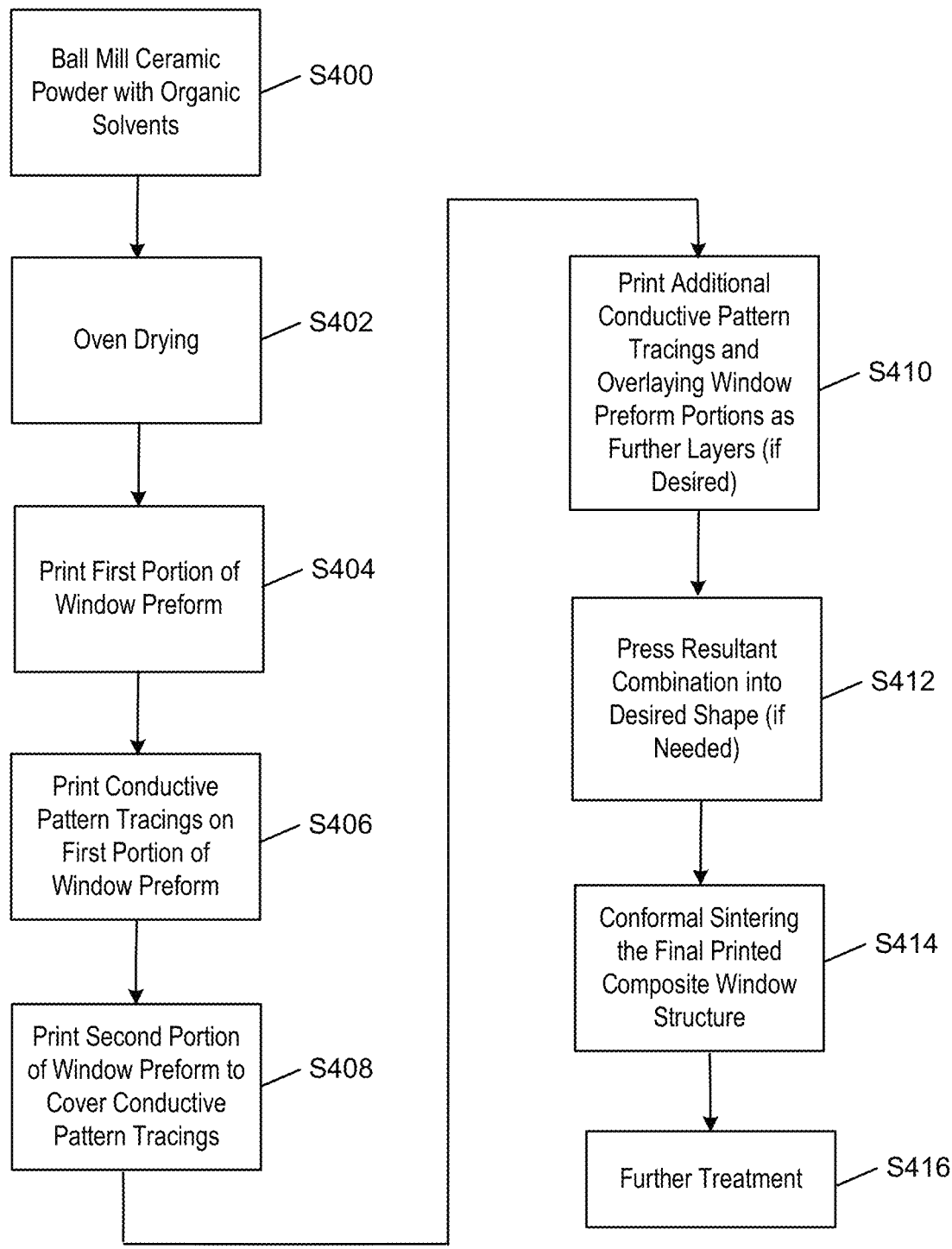
FIGS. 5A, 5B, and 5C provide a flow chart and illustrate various features of a direct integration method for producing infrared transparent constructs in accordance with some examples of this technology.
Figure 5B:
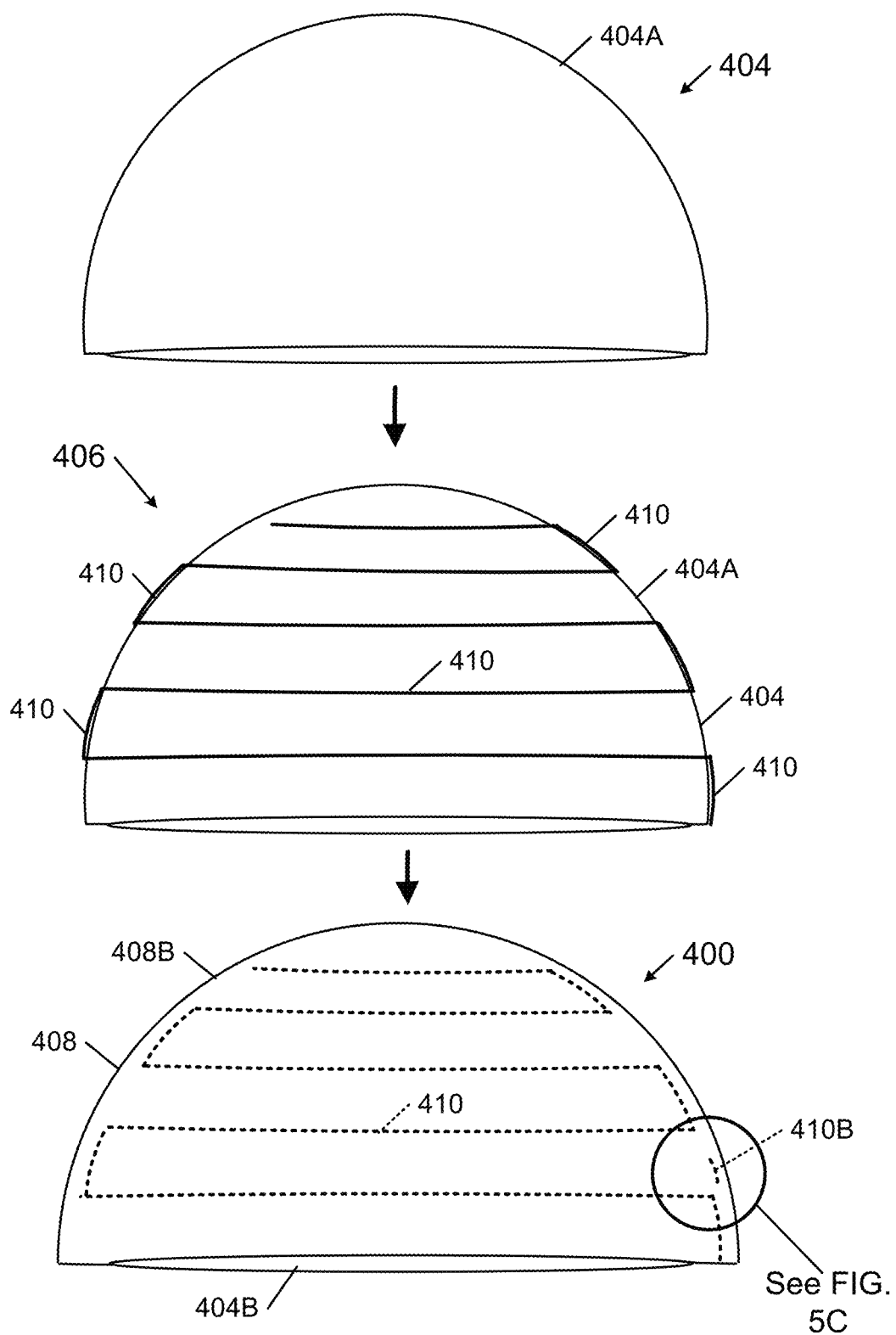
Figure 6A:
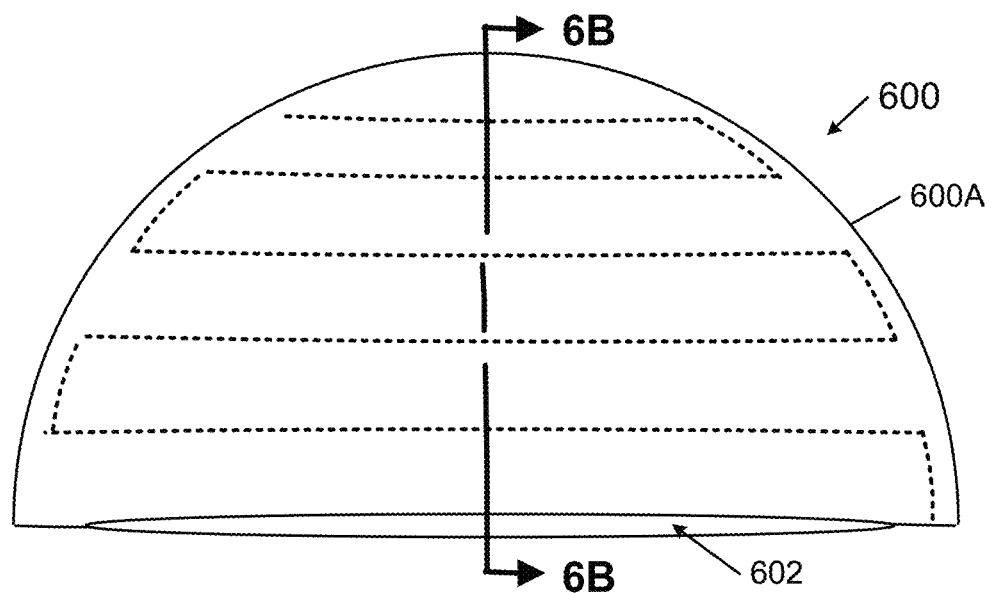
FIGS. 6A and 6B provide side and cross sectional views, respectively, of an example infrared transparent construct produced by the method described in conjunction with FIGS. 5A, 5B, and 5C.
Figure 6B:
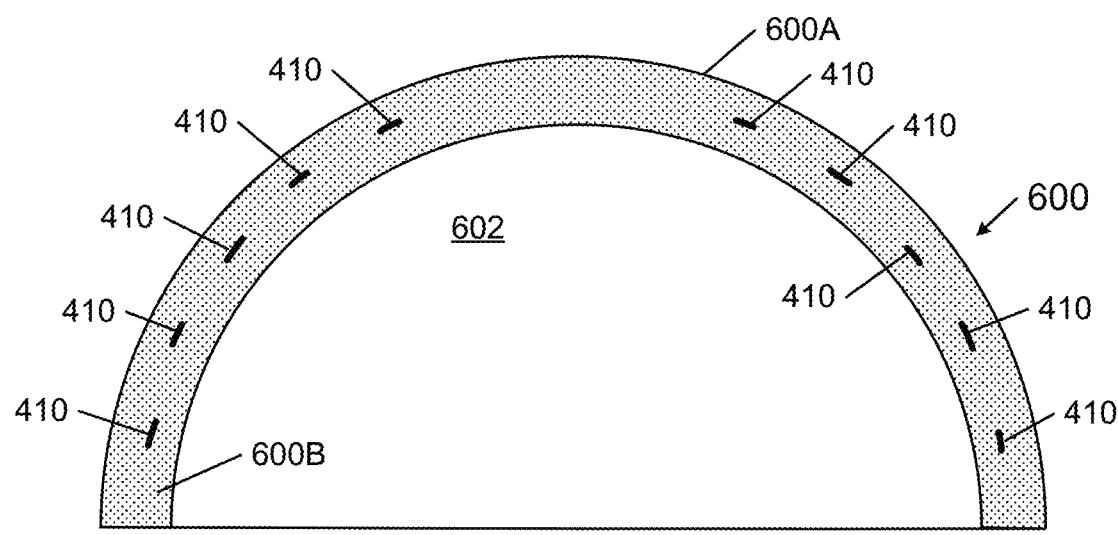

FIGS. 5A and 5B provide diagrams of another method of forming infrared transparent windows (or other constructs) in accordance with aspects of this technology in which at least some portions of conductive tracing(s) (or other structures) is/are not exposed at the exterior surface of (and thus are protected within) the final product. FIGS. 6A and 6B provide side and sectional views, respectively, of an infrared transparent window 400 (or other construct) formed by the process described in conjunction with FIGS. 5A and 5B. As a first Step S400 in this example process, a ceramic material powder, such as zinc sulfide, aluminum oxynitride, magnesium fluoride, and/or spinel, may be mixed in a ball mill with one or more organic solvents, such as isopropyl alcohol, ethanol, etc., for several hours, e.g., from 4 to 12 hours. This mixed ceramic material may then be dried at Step S402, e.g., in a conventional manner, such as in an oven at 200° C. for a sufficient time to reach a desired level of dryness (e.g., 1 hour to 12 hours). To this point, the process may correspond to the processes described above with respect to Steps S200 to S202 and Steps S300 to S302 and the production of window preforms 204, 304, and 306 in conjunction with FIGS. 2A-3B. Further, any of the various features, options, and/or alternatives described above with respect to Steps S200 to S202 and/or Steps S300 to S302 may be used in the process of FIGS. 5A and 5B. Thus, much of the description of these similar process steps is omitted from this description of FIGS. 5A and 5B.

The ceramic material produced may be further treated into a form suitable for use as printing media material in a 3D printing process, such as printing media material for an aerosol jet method, an inkjet method, an extrusion method (e.g., paste extrusion), a fused deposition modeling method, a laser sintering method, etc. Then, at Step S404, a first portion 404 of a window preform may be printed. As some more specific examples, at this stage, the first portion 404 of the window preform may be printed into a desired shape, e.g., a shape shown in FIGS. 1A-1C, but only 10% to 90% of an overall total thickness of the final window preform thickness is formed at this Step S404. In some examples, the first portion 404 of the printed window preform may be from 25% to 85%, from 35% to 80%, or from 45% to 75% of an overall total thickness of the final window preform to be produced in the printing process.

At Step S406, a pattern of conductive material (including one or more conductive tracing 410 segments) may be printed onto the surface 404A of the first portion 404 of the window preform. This printing Step S406 may be performed using any desired type of 3D printing process, such as an aerosol jet method, an ink jet method, an extrusion method (e.g., paste extrusion), etc. Surface 404A onto which the tracing(s) 410 is/are printed also is called an "intermediate surface" herein. The tracing(s) 410 (which may be continuous or discontinuous on the intermediate surface 404A) may form at least a portion of: EMI shielding, an FSS grid, an anti-static component, wiring to and/or from one or more electronic components, wiring to an electrical ground, etc. The resultant composite structure 406 including the first portion 404 and the tracing(s) 410 may be considered a window preform.

Then, at Step S408, a second portion 408 of the window preform is printed to at least partially cover the conductive tracing(s) 410 (tracing(s) 410 is/are shown in broken lines in the bottom of FIG. 5B). In at least some examples, the second portion 408 may cover at least 50% of the tracing(s) 410 surface area and/or linear length (and in some examples, at least 60%, at least 75%, at least 80%, at least 90%, or even at least 95% of the tracing(s) 410 surface area and/or linear length will be covered by second portion 408). In this manner, the conductive tracing(s) 410 (or at least any desired portion(s) thereof) are not externally exposed in the window preform 400 (i.e., desired portions of the tracing(s) 410 are covered by further printed layers in the overall printed window preform 400). This printed and layered construction will help protect the tracing(s) 410 in the remaining processing steps and in use.

Figure 5C:
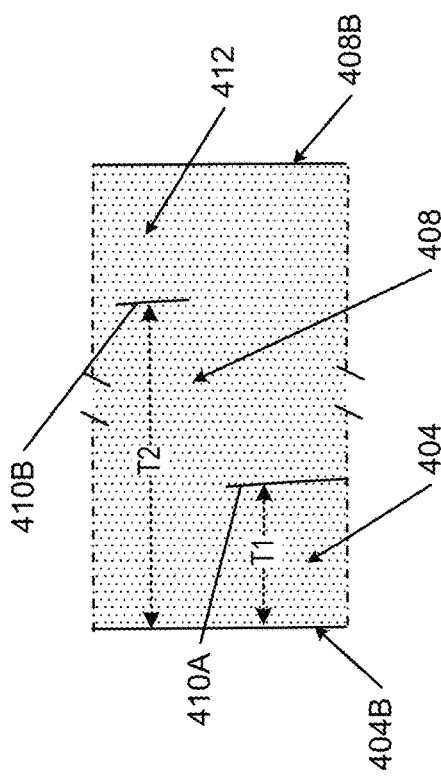

In some examples, at Step S408, the second portion 408 of the window preform may be printed to create the exterior surface 408B into a desired shape, e.g., a shape shown in FIGS. 1A-1C, and to form a remainder of an overall total thickness of the final window preform thickness (e.g., the remainder of the window preform 400 may be printed at Step S408). Alternatively, as shown in Step S410, if desired, additional conductive pattern tracing(s) and/or additional overlaying printed layers may be printed to form the final window preform 400. Multiple steps of printing conductive tracing(s) in different layers of the final window preform 400 may be used, e.g., to place conductive tracing(s) at different relative positions in the overall final window preform, to form more than one component in the final window preform (e.g., two or more of EMI shielding, an FSS grid, an anti-static component, wiring to and/or from one or more electronic components, wiring to an electrical ground, etc.), etc. For example, as shown in FIG. 5C (a vertical partial section of the view shown in the circled area in FIG. 5B): (a) one tracing segment layer 410A may be printed on the intermediate surface (e.g., 404A) of the first portion 404 of the window preform when it is at a thickness of T1, (b) the second portion 408 of the window preform may be printed on top of the first portion 404 and (at least partially) covering tracing segment layer 410A, (c) another tracing segment layer 410B may be printed on the intermediate surface of the second portion 408 of the window preform when it is at thickness T2, and (d) one or more additional layers 412 of the window preform (and/or one or more additional tracing 410 segments) may be printed on top of the second portion 408 and (at least partially) covering tracing segment layer 410B).

At Step S412, the window preform 400—including the conductive tracing(s) 410 at least partially embedded within the printed window preform 400 body—may be pressed into a desired final shape and/or to compact the structure. This pressing Step S412, when present, may alter the thickness of the printed window preform 400.

Once the window preform 400 is prepared (and in some examples pressed and/or further treated), the composite structure of the window preform 400 may be sintered S414, e.g., using an ultrafast high-temperature sintering technique in a conformal sintering process. In the sintering Step S414, window preform 400 may be placed between heating elements, and the heating elements may be heated and cooled (and the sintering otherwise also takes place) based on an ultrafast high-temperature sintering technique, as described above in conjunction with FIGS. 3A and 3B. This conformal sintering Step S414 may take place using: (a) one heating element configured to or configurable to correspond to the shape of at least a portion of the interior surface 404B of the window preform 400 (e.g., at least 50% of the area of interior surface 404B) and (b) one heating element configured to or configurable to correspond to the shape of at least a portion of the exterior surface 408B of the window preform 400 (e.g., at least 50% of the area of exterior surface 408B). Additionally or alternatively, in some examples of this technology, one of the heating elements may have a surface area that is configured to or configurable to contact a portion of the interior surface 404B corresponding with the location(s) of the tracing(s) 410 and one of the heating elements may have a surface area that is configured to or configurable to contact a portion of the exterior surface 408B corresponding with the location(s) of the tracing 410 segments. Additionally or alternatively, in some examples of this technology, the heating elements may have sufficient surface area at least to correspond to and sinter an area of the infrared transparent window that will be exposed to the external environment in the final product in which the infrared transparent window is placed. Heating elements of the types described with respect to and illustrated in FIGS. 3A and 3B may be used in sintering Step S414.

If desired (e.g., depending on the ultimate target end use), e.g., after the sintering Step S414 (and/or any other suitable time in the process), any further desired treatments and/or manufacturing steps (e.g., to incorporate the window into a final product) may be completed (Step S416). Such additional treatments may comprise one or more of: chemical vapor deposition treatment of one or more surfaces; sputtering processes; atomic layer deposition; transparency-enhancing or modifying treatments; hardness-enhancing or modifying treatments; etc. Such additional manufacturing steps may comprise: attachment of hardware components; electrically connecting to other components; further shaping; engagement in a detector system or other product; etc.

FIGS. 6A and 6B provide side and sectional views, respectively, of an infrared transparent window 600 (or other construct) formed by the process described above in conjunction with FIGS. 5A and 5B. As shown, the infrared transparent window 600 includes the conductive tracing(s) 410 embedded within the interior 600B of the continuous printed structure (the continuous printed structure also may constitute a "window base component" as that term is used herein) forming the infrared transparent window 600. The infrared transparent window 600 of this example may be seamless. The tracing(s) 410 is/are shown in broken lines in FIG. 6A because they are not exposed at the exterior surface 600A of this example infrared transparent window 600. An open interior space 602 may be defined within the infrared transparent window 600 (and hardware components or other parts of a final product may be located at least partially within this open interior space 602).

Figure 7:
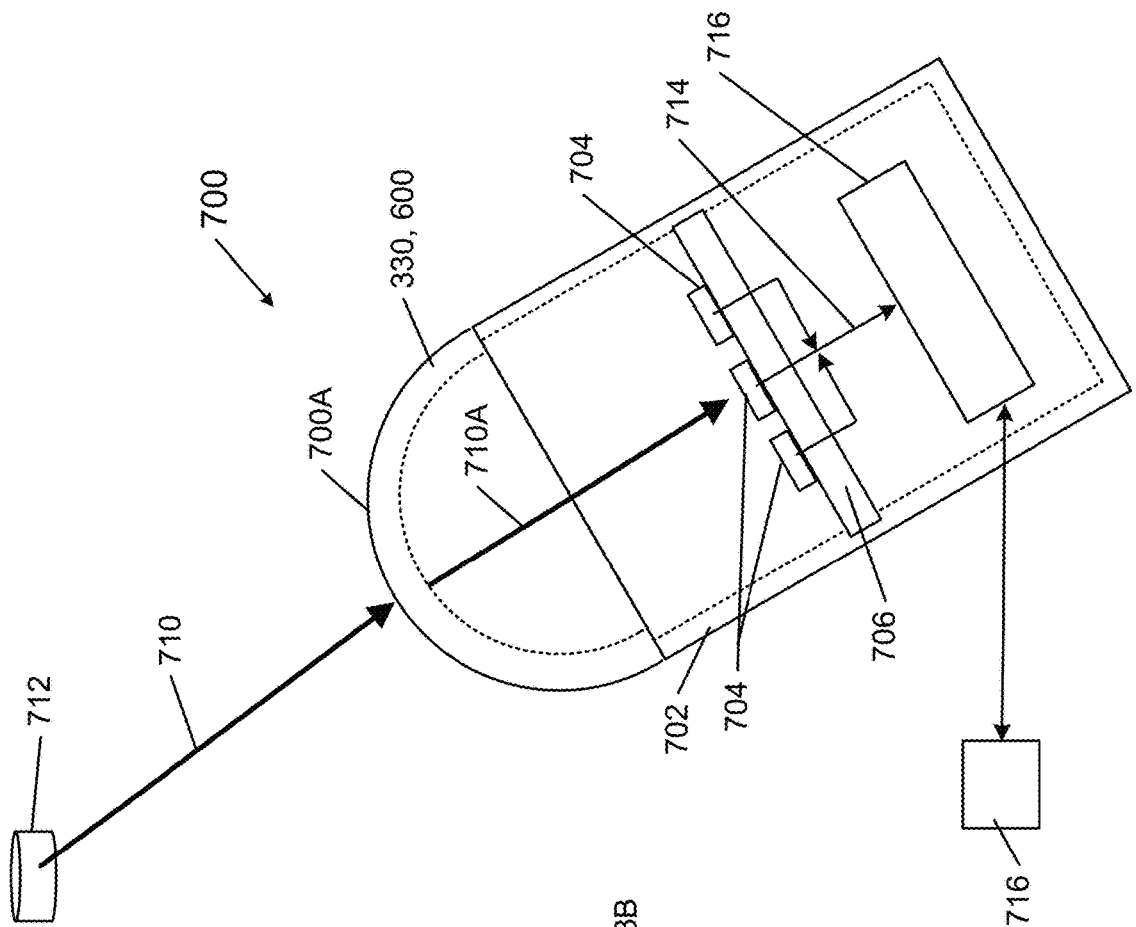
FIG. 7 illustrates an example of infrared transparent constructs in accordance with aspects of this technology incorporated into a final product and functioning as an infrared transparent window.

FIG. 7 illustrates an infrared detection system 700, such as a thermal imaging camera, night vision goggles, a remote control, a thermometer, a guidance system (e.g., for missiles), an infrared seeker, etc., in accordance with some aspects of this technology. The infrared detection system 700 includes a housing 702 or other structure for supporting one or more infrared sensors 704 (e.g., sensor(s) 704 may be mounted on a base 706 supported within the housing 702 and facing window 330, 600). Such infrared sensor(s) 704, including sensor arrays, are commercially available and known in the art. In this illustrated example, one end of the infrared detection system 700 includes an infrared transparent window 330, 600 in accordance with aspects of this technology, e.g., of the types described above. The infrared transparent window 330, 600 forms an exposed surface 700A of the infrared detection system 700, and it is positioned and configured to transmit at least some infrared radiation 710 incident on the exposed surface 700A to the infrared sensor(s) 704. Optionally, if desired, the infrared transparent window 330, 600 may be shaped and/or positioned with respect to the infrared sensor(s) 704 to "bend" incoming radiation 710 in a direction to become incident on the infrared sensor(s) 704 (akin to the manner in which an optical lens "bends" visible light).

As shown in FIG. 7, infrared radiation 710 emitted from an object 712 (e.g., an object to be tracked, a target for a missile or other projectile, etc.) is incident on the exposed surface 700A of the detection system 700 (on the exterior surface of infrared transparent window 330, 600). At least some portion of the incident radiation 710 (e.g., one or more infrared wavelengths or infrared wavelength bands) passes through the infrared transparent window 330, 600. In this manner the infrared transparent window 330, 600 is transparent to at least some portion of the incident radiation 710 (e.g., one or more wavelengths or wavelength bands), shown by reference number 710A in FIG. 7. Once inside, this portion 710A of the radiation transmits to the infrared sensor(s) 704. The sensor(s) 704 may provide output data 714 to one or more other electronic components 716 located internal to and/or external to the housing 702. The data 714 may be used for any desired purpose. For example, infrared detection systems 700 may provide input data to a thermal camera, other imaging system(s), tracking systems, guidance systems, etc., including electronic components 716 as are conventionally known and commercially available.

Some example aspects of this technology may start with an existing infrared transparent construct (e.g., a commercially available infrared transparent dome and/or infrared transparent window) to which a hardened infrared transparent construct is applied according to aspects of this technology. As a more specific example, returning to the example processes described above in conjunction with FIGS. 5A-6B, rather than completing steps S400, S402, and S404, the first portion 404 of the window preform may be obtained as an existing product (e.g., from a commercial source). Step S406 (printing conductive tracing(s) 410) may be performed, e.g., if such tracing(s) 410 are needed in the product being formed and/or if such tracing(s) 410 are not already present on the first portion 404. Then, Step S408 may be performed to form a new layer of an infrared transparent construct (e.g., second portion 408 of the window preform) on the first portion 404 (and over any previously present and/or newly added tracing(s) 410). Steps S410 and/or S412 also can be performed, e.g., if required in the desired product. Then conformal sintering of the combined "existing product" first portion 404 and the newly printed second portion 408 can be completed (Step S414). Any further treatments (S416) also can be completed, if needed for the desired final product. In this manner, in accordance with at least some examples of this aspect of the technology, a hardened "coating" or layer can be formed on an existing infrared transparent construct product. This process could be used, for example, to retrofit existing products with a hardened layer (and thus potentially make those products more suitable for use in different applications).

While some of the illustrated examples of this technology relate to infrared transparent constructs in the form of conformal domes, aspects of this technology can be applied to providing infrared transparent constructs of a wide variety of shapes, including: shapes in which the interior surface and/or the exterior surface is/are a non-planar surface; shapes in which the interior surface and/or the exterior surface is/are shaped as a section of a sphere; shapes in which the interior surface and/or the exterior surface is/are shaped as a section of a cylinder; shapes in which the interior surface and/or the exterior surface have substantially the same shape and/or follow substantially the same general contour; shapes in which the interior surface and/or the exterior surface is/are arranged concentrically; shapes in which the interior surface and/or the exterior surface is/are planar; have shapes that form a window having a constant thickness; have shapes that form a window having differing thickness; etc. Alternatively, if desired, the interior surface and the exterior surface may be shaped different from one another and/or given a non-standard shape.

CONCLUSION

For the avoidance of doubt, the present application includes, but is not limited to, the subject-matter described in the following numbered clauses:

Clause 1. An infrared transparent window, comprising:
a window base component including an interior surface and an exterior surface opposite the interior surface, wherein the window base component is comprised of an infrared transparent ceramic or plastic material; and a first tracing comprising an electrically conductive material, wherein optionally at least 50% of a surface area or linear length of the first tracing comprises an embedded tracing portion embedded in the window base component between the interior surface and the exterior surface.

Clause 2. The infrared transparent window according to Clause 1, wherein each of the interior surface and the exterior surface is a non-planar surface.

Clause 3. The infrared transparent window according to Clause 1, wherein each of the interior surface and the exterior surface is shaped as a section of a sphere.

Clause 4. The infrared transparent window according to Clause 1, wherein each of the interior surface and the exterior surface is dome shaped.

Clause 5. The infrared transparent window according to any one of Clauses 1 to 4, wherein the infrared transparent ceramic or plastic material includes at least one member selected from the group consisting of zinc sulfide, aluminum oxynitride, magnesium fluoride, and spinel.

Clause 6. The infrared transparent window according to any one of Clauses 1 to 5, wherein the infrared transparent window comprises an infrared seeker dome.

Clause 7. The infrared transparent window according to any one of Clauses 1 to 6, wherein the first tracing is formed as one of the following: electromagnetic interference shielding, a frequency selective surface grid, or an anti-static component.

Clause 8. The infrared transparent window according to any one of Clauses 1 to 7, wherein the window base component comprises: (a) a first window component forming the interior surface and a first intermediate surface opposite the interior surface, and (b) a second window component forming the exterior surface and a second intermediate surface opposite the exterior surface, wherein the first intermediate surface faces and contacts the second intermediate surface, and wherein the embedded tracing portion is located between and in contact with the first intermediate surface and the second intermediate surface.

Clause 9. The infrared transparent window according to any one of Clauses 1 to 7, wherein the window base component comprises a printed component forming the interior surface and the exterior surface, and wherein the embedded tracing portion is a printed structure printed between and spaced from the interior surface and the exterior surface.

Clause 10. An infrared transparent window, comprising:
an interior window component having an interior surface and an exterior surface, wherein the interior window component comprises a first infrared transparent ceramic or plastic material;
an exterior window component having an interior surface and an exterior surface, wherein at least a portion of the interior surface of the exterior window component contacts the exterior surface of the interior window component to form a contacting surface portion of the infrared transparent window, and wherein the exterior window component comprises the first infrared transparent ceramic or plastic material or a second infrared transparent ceramic or plastic material that differs from the first infrared transparent ceramic or plastic material; and
a first tracing at least partially located between the exterior surface of the interior window component and the interior surface of the exterior window component, wherein the first tracing comprises an electrically conductive material, and wherein optionally at least a portion of a surface area or linear length of the first tracing contacts both the exterior surface of the interior window component and the interior surface of the exterior window component.

Clause 11. The infrared transparent window according to Clause 10, wherein each of the exterior surface of the interior window component and the interior surface of the exterior window component is a non-planar surface.

Clause 12. The infrared transparent window according to Clause 10, wherein each of the exterior surface of the interior window component and the interior surface of the exterior window component at the contacting surface portion is shaped as a section of a sphere.

Clause 13. The infrared transparent window according to Clause 10, wherein each of the exterior surface of the interior window component and the interior surface of the exterior window component at the contacting surface portion is dome shaped.

Clause 14. The infrared transparent window according to any one of Clauses 10 to 13, wherein the first infrared transparent ceramic or plastic material includes at least one member selected from the group consisting of zinc sulfide, aluminum oxynitride, magnesium fluoride, and spinel.

Clause 15. The infrared transparent window according to any one of Clauses 10 to 14, wherein the exterior window component comprises the second infrared transparent ceramic or plastic material.

Clause 16. The infrared transparent window according to Clause 15, wherein the second infrared transparent ceramic or plastic material includes at least one member selected from the group consisting of zinc sulfide, aluminum oxynitride, magnesium fluoride, and spinel.

Clause 17. The infrared transparent window according to any one of Clauses 10 to 16, wherein the portion of the surface area or linear length of the first tracing that contacts both the exterior surface of the interior window component and the interior surface of the exterior window component includes at least 50% of the surface area or linear length of the first tracing.

Clause 18. The infrared transparent window according to any one of Clauses 10 to 17, wherein the infrared transparent window comprises an infrared seeker dome.

Clause 19. The infrared transparent window according to any one of Clauses 10 to 18, wherein the first tracing is formed as one of the following: electromagnetic interference shielding, a frequency selective surface grid, or an anti-static component.

Clause 20. An infrared transparent window, comprising:
a window base component printed to include an interior surface and an exterior surface as a unitary, one-piece structure, wherein the window base component comprises a first infrared transparent ceramic or plastic material; and
a first printed tracing embedded within the first infrared transparent ceramic or plastic material and located between the interior surface and the exterior surface of the window base component, wherein the first printed tracing comprises an electrically conductive material.

Clause 21. The infrared transparent window according to Clause 20, wherein each of the exterior surface and the interior surface of the window base component is a non-planar surface.

Clause 22. The infrared transparent window according to Clause 20, wherein at least a portion of the exterior surface of the window base component is shaped as a section of a sphere.

Clause 23. The infrared transparent window according to Clause 20, wherein at least a portion of the exterior surface of the window base component is dome shaped.

Clause 24. The infrared transparent window according to any one of Clauses 20 to 23, wherein the first infrared transparent ceramic or plastic material includes at least one member selected from the group consisting of zinc sulfide, aluminum oxynitride, magnesium fluoride, and spinel.

Clause 25. The infrared transparent window according to any one of Clauses 20 to 24, wherein the infrared transparent window comprises an infrared seeker dome.

Clause 26. The infrared transparent window according to any one of Clauses 20 to 25, wherein the first printed tracing is formed as one of the following: electromagnetic interference shielding, a frequency selective surface grid, or an anti-static component.

Clause 27. An infrared detection system, comprising:
a housing;
one or more infrared sensors mounted within the housing; and
an infrared transparent window according to any one of Clauses 1 to 26 forming an exposed surface of the infrared detection system, wherein the infrared transparent window is positioned and configured to transmit at least some infrared radiation incident on the exposed surface to the one or more infrared sensors.

Clause 28. A method of forming an infrared transparent window, comprising:
forming an interior window component having an interior surface and an exterior surface, wherein the interior window component comprises a first infrared transparent ceramic or plastic material;
forming an exterior window component having an interior surface and an exterior surface, wherein the exterior window component comprises the first infrared transparent ceramic or plastic material or a second infrared transparent ceramic or plastic material that differs from the first infrared transparent ceramic or plastic material;
forming a first tracing on one of the exterior surface of the interior window component or the interior surface of the exterior window component, wherein the first tracing comprises an electrically conductive material;
engaging the interior window component with the exterior window component such that at least a portion of the exterior surface of the interior window component contacts the interior surface of the exterior window component at a contact surface portion and such that at least a portion of a surface area or linear length of the first tracing contacts both the exterior surface of the interior window component and the interior surface of the exterior window component.

Clause 29. The method according to Clause 28, wherein each of the exterior surface of the interior window component and the interior surface of the exterior window component is formed as a non-planar surface.

Clause 30. The method according to Clause 28, wherein each of the exterior surface of the interior window component and the interior surface of the exterior window component at the contacting surface portion is formed in a shape as a section of a sphere.

Clause 31. The method according to Clause 28, wherein each of the exterior surface of the interior window component and the interior surface of the exterior window component at the contacting surface portion is formed in a dome shape.

Clause 32. The method according to any one of Clauses 28 to 31, wherein the first infrared transparent ceramic or plastic material includes at least one member selected from the group consisting of zinc sulfide, aluminum oxynitride, magnesium fluoride, and spinel.

Clause 33. The method according to any one of Clauses 28 to 32, wherein the exterior window component comprises the second infrared transparent ceramic or plastic material.

Clause 34. The method according to Clause 33, wherein the second infrared transparent ceramic or plastic material includes at least one member selected from the group consisting of zinc sulfide, aluminum oxynitride, magnesium fluoride, and spinel.

Clause 35. The method according to any one of Clauses 28 to 34, wherein the portion of the surface area or linear length of the first tracing that contacts both the exterior surface of the interior window component and the interior surface of the exterior window component includes at least 50% of the surface area or linear length of the first tracing.

Clause 36. The method according to any one of Clauses 28 to 35, wherein the step of forming the interior window component includes printing the first infrared transparent ceramic or plastic material.

Clause 37. The method according to any one of Clauses 28 to 36, wherein the step of forming the interior window component includes pressing the first infrared transparent ceramic or plastic material into a different shape.

Clause 38. The method according to any one of Clauses 28 to 37, wherein the step of forming the exterior window component includes printing the first infrared transparent ceramic or plastic material or the second infrared transparent ceramic or plastic material.

Clause 39. The method according to any one of Clauses 28 to 38, wherein the step of forming the exterior window component includes pressing the first infrared transparent ceramic or plastic material or the second infrared transparent ceramic or plastic material into a different shape.

Clause 40. The method according to any one of Clauses 28 to 39, wherein the step of forming the first tracing includes printing the electrically conductive material on one of the exterior surface of the interior window component or the interior surface of the exterior window component.

Clause 41. The method according to any one of Clauses 38 to 40, wherein after the engaging step, the interior window component and the exterior window component form a composite window component, and wherein the method further includes sintering the composite window component in a heating system.

Clause 42. The method according to Clause 41, wherein the heating system includes a first heating surface configured or configurable to contact at least a portion of the interior surface of the interior window component and a second heating surface configured or configurable to contact at least a portion of the exterior surface of the exterior window component.

Clause 43. The method according to Clause 41 or 42, wherein the sintering step utilizes an ultrafast high-temperature sintering technique.

Clause 44. The method according to Clause 41 or 42, wherein the sintering step includes increasing temperature of one or more heating elements forming the first heating surface and the second heating surface from a start temperature to a sintering temperature in 1 minute or less.

Clause 45. The method according to any one of Clauses 41, 42, or 44, wherein the sintering step includes isothermal sintering for a time period of less than 30 seconds.

Clause 46. The method according to any one of Clauses 41, 42, 44, or 45, wherein after sintering is complete, the method includes cooling within a time period of less than 20 seconds.

Clause 47. The method according to any one of Clauses 28 to 46, wherein the step of forming the first tracing forms the first tracing as one of the following: electromagnetic interference shielding, a frequency selective surface grid, or an anti-static component.

Clause 48. An infrared transparent window made by the method according to any one of Clauses 28 to 47.

Clause 49. An infrared seeker dome including an infrared transparent window made by the method according to any one of Clauses 28 to 47.

Clause 50. A method of forming an infrared transparent window, comprising:
  printing a first infrared transparent ceramic or plastic material to form an intermediate window base component that includes an interior surface and an intermediate surface;
  printing an electrically conductive material to form a first tracing on the intermediate surface; and
  printing the first infrared transparent ceramic or plastic material to form a window base component having an exterior surface, wherein in the window base component, the first infrared transparent ceramic or plastic material is printed to contact and at least partially cover the intermediate surface and to contact and at least partially cover the first tracing.

Clause 51. The method according to Clause 50, wherein each of the interior surface and the exterior surface is a non-planar surface.

Clause 52. The method according to Clause 50, wherein at least a portion of the exterior surface of the window base component is shaped as a section of a sphere.

Clause 53. The method according to Clause 50, wherein at least a portion of the exterior surface of the window base component is dome shaped.

Clause 54. The method according to any one of Clauses 50 to 53, wherein the first infrared transparent ceramic or plastic material includes at least one member selected from the group consisting of zinc sulfide, aluminum oxynitride, magnesium fluoride, and spinel.

Clause 55. The method according to any one of Clauses 50 to 54, further comprising pressing at least one of the intermediate window base component or the window base component to change a shape thereof.

Clause 56. The method according to any one of Clauses 50 to 55, wherein after the step of printing the first infrared transparent ceramic or plastic material to form the window base component, the method further includes sintering the window base component in a heating system.

Clause 57. The method according to Clause 56, wherein the heating system includes a first heating surface configured or configurable to contact at least a portion of the interior surface and a second heating surface configured or configurable to contact at least a portion of the exterior surface.

Clause 58. The method according to Clause 56 or 57, wherein the sintering step utilizes an ultrafast high-temperature sintering technique.

Clause 59. The method according to Clause 56 or 57, wherein the sintering step includes increasing temperature of one or more heating elements forming the first heating surface and the second heating surface from a start temperature to a sintering temperature in 1 minute or less.

Clause 60. The method according to any one of Clauses 56, 57, or 59, wherein the sintering step includes isothermal sintering for a time period of less than 30 seconds.

Clause 61. The method according to any one of Clauses 56, 57, 59, or 60, wherein after sintering is complete, the method includes cooling within a time period of less than 20 seconds.

Clause 62. The method according to any one of Clauses 50 to 61, wherein the step of printing the electrically conductive material forms the first tracing as one of the following: electromagnetic interference shielding, a frequency selective surface grid, or an anti-static component.

Clause 63. An infrared transparent window made by the method according to any one of Clauses 50 to 62.

Clause 64. An infrared seeker dome including an infrared transparent window made by the method according to any one of Clauses 50 to 62.

The foregoing has been presented for purposes of example. The foregoing is not intended to be exhaustive or to limit features to the precise form disclosed. The examples discussed herein were chosen and described in order to explain principles and the nature of various examples and their practical application to enable one skilled in the art to use these and other implementations with various modifications as are suited to the particular use contemplated. The scope of this disclosure encompasses, but is not limited to, any and all combinations, subcombinations, and permutations of structure, operations, and/or other features described herein and in the accompanying drawing figures.

The invention claimed is:

1. An infrared seeker dome, comprising:
  a window base component including an interior surface and an exterior surface opposite the interior surface, wherein the window base component is comprised of an infrared transparent ceramic material; and
  a first tracing comprising an electrically conductive material, wherein the first tracing comprises an embedded tracing portion embedded in the window base component between the interior surface and the exterior surface.

2. The infrared seeker dome according to claim 1, wherein each of the interior surface and the exterior surface is shaped as a section of a sphere.

3. The infrared seeker dome according to claim 1, wherein the window base component comprises: (a) a first window component forming the interior surface and a first intermediate surface opposite the interior surface, and (b) a second window component forming the exterior surface and a second intermediate surface opposite the exterior surface, wherein the first intermediate surface faces and contacts the second intermediate surface, and wherein the embedded tracing portion is located between and in contact with the first intermediate surface and the second intermediate surface.

4. The infrared seeker dome according to claim 1, wherein the window base component comprises a printed component forming the interior surface and the exterior surface, and wherein the embedded tracing portion is a printed structure printed between and spaced from the interior surface and the exterior surface.

5. An infrared transparent window, comprising:
  an interior window component having an interior surface and an exterior surface, wherein the interior window component comprises a first infrared transparent ceramic material;

an exterior window component having an interior surface and an exterior surface, wherein at least a portion of the interior surface of the exterior window component contacts the exterior surface of the interior window component to form a contacting surface portion of the infrared transparent window, and wherein the exterior window component comprises the first infrared transparent ceramic material or a second infrared transparent ceramic material that differs from the first infrared transparent ceramic material; and a first tracing at least partially located between the exterior surface of the interior window component and the interior surface of the exterior window component, wherein the first tracing comprises an electrically conductive material.

6. The infrared transparent window according to claim 5, wherein each of the exterior surface of the interior window component and the interior surface of the exterior window component is a non-planar surface.

7. The infrared transparent window according to claim 5, wherein each of the exterior surface of the interior window component and the interior surface of the exterior window component at the contacting surface portion is shaped as a section of a sphere.

8. The infrared transparent window according to claim 5, wherein each of the exterior surface of the interior window component and the interior surface of the exterior window component at the contacting surface portion is dome shaped.

9. The infrared transparent window according to claim 5, wherein the first infrared transparent ceramic material includes at least one member selected from the group consisting of zinc sulfide, aluminum oxynitride, magnesium fluoride, and spinel.

10. The infrared transparent window according to claim 5, wherein the exterior window component comprises the second infrared transparent ceramic material, and wherein the second infrared transparent ceramic material includes at least one member selected from the group consisting of zinc sulfide, aluminum oxynitride, magnesium fluoride, and spinel.

11. The infrared transparent window according to claim 5, wherein a portion of a surface area or a linear length of the first tracing that contacts both the exterior surface of the interior window component and the interior surface of the exterior window component includes at least 50% of the surface area or linear length of the first tracing.

12. The infrared transparent window according to claim 5, wherein the infrared transparent window comprises an infrared seeker dome.

13. The infrared transparent window according to claim 5, wherein the first tracing is formed as one of the following: electromagnetic interference shielding, a frequency selective surface grid, or an anti-static component.

14. An infrared transparent window, comprising:

a window base component printed to include an interior surface and an exterior surface as a unitary, one-piece structure, wherein the window base component comprises a first infrared transparent ceramic material; and a first printed tracing embedded within the first infrared transparent ceramic material and located between the interior surface and the exterior surface of the window base component, wherein the first printed tracing comprises an electrically conductive material.

15. The infrared transparent window according to claim 14, wherein each of the exterior surface and the interior surface of the window base component is a non-planar surface.

16. The infrared transparent window according to claim 14, wherein at least a portion of the exterior surface of the window base component is shaped as a section of a sphere.

17. The infrared transparent window according to claim 14, wherein at least a portion of the exterior surface of the window base component is dome shaped.

18. The infrared transparent window according to claim 14, wherein the first infrared transparent ceramic material includes at least one member selected from the group consisting of zinc sulfide, aluminum oxynitride, magnesium fluoride, and spinel.

19. The infrared transparent window according to claim 14, wherein the infrared transparent window comprises an infrared seeker dome.

20. The infrared transparent window according to claim 14, wherein the first printed tracing is formed as one of the following: electromagnetic interference shielding, a frequency selective surface grid, or an anti-static component.

\* \* \* \* \*